United States Patent [19]
Campbell, Jr.

[11] 3,752,972
[45] Aug. 14, 1973

[54] DIGITAL RATIO CIRCUIT INCLUDING ZERO SUPPRESSION

[75] Inventor: Loran William Campbell, Jr., Colts Neck, N.J.

[73] Assignee: Bell Telephone Laboratories, Incorporated, Murray Hill, Berkeley Heights, N.J.

[22] Filed: Dec. 27, 1971

[21] Appl. No.: 212,204

[52] U.S. Cl............... 235/196, 178/69 A, 235/183, 328/161, 340/146.2
[51] Int. Cl........................... G06g 7/16, G06f 7/52
[58] Field of Search................... 235/183, 184, 195, 235/196; 328/161; 178/69 A, 69 G, 69 L

[56] References Cited
UNITED STATES PATENTS

| | | | |
|---|---|---|---|
| 3,550,022 | 12/1970 | Yareck | 328/161 |
| 3,652,930 | 3/1972 | Sugiyama et al. | 328/161 X |
| 3,636,332 | 1/1972 | Nelson et al. | 235/195 |
| 3,502,983 | 3/1970 | Ingle et al. | 235/196 |

FOREIGN PATENTS OR APPLICATIONS

| | | | |
|---|---|---|---|
| 1,170,685 | 5/1964 | Germany | 235/196 |

*Primary Examiner*—Gruber, Felix D.
*Attorney*—W. L. Keefauver et al.

[57] ABSTRACT

A digital indication of a ratio measurement on a zero suppressed scale is obtained directly by employing a summing integrator. An analog signal representative of the desired ratio indication is generated by selectively controlling the supply of test signals to the integrator. A comparator circuit is employed to generate a pulse signal having a width representative of the interval between prescribed threshold levels of the integrator output. Timing circuits, decade counters, flip-flop circuits and logic gates are utilized to convert the comparator output into digital form and to generate signals for selectively controlling the supply of test signals to the summing integrator.

10 Claims, 5 Drawing Figures

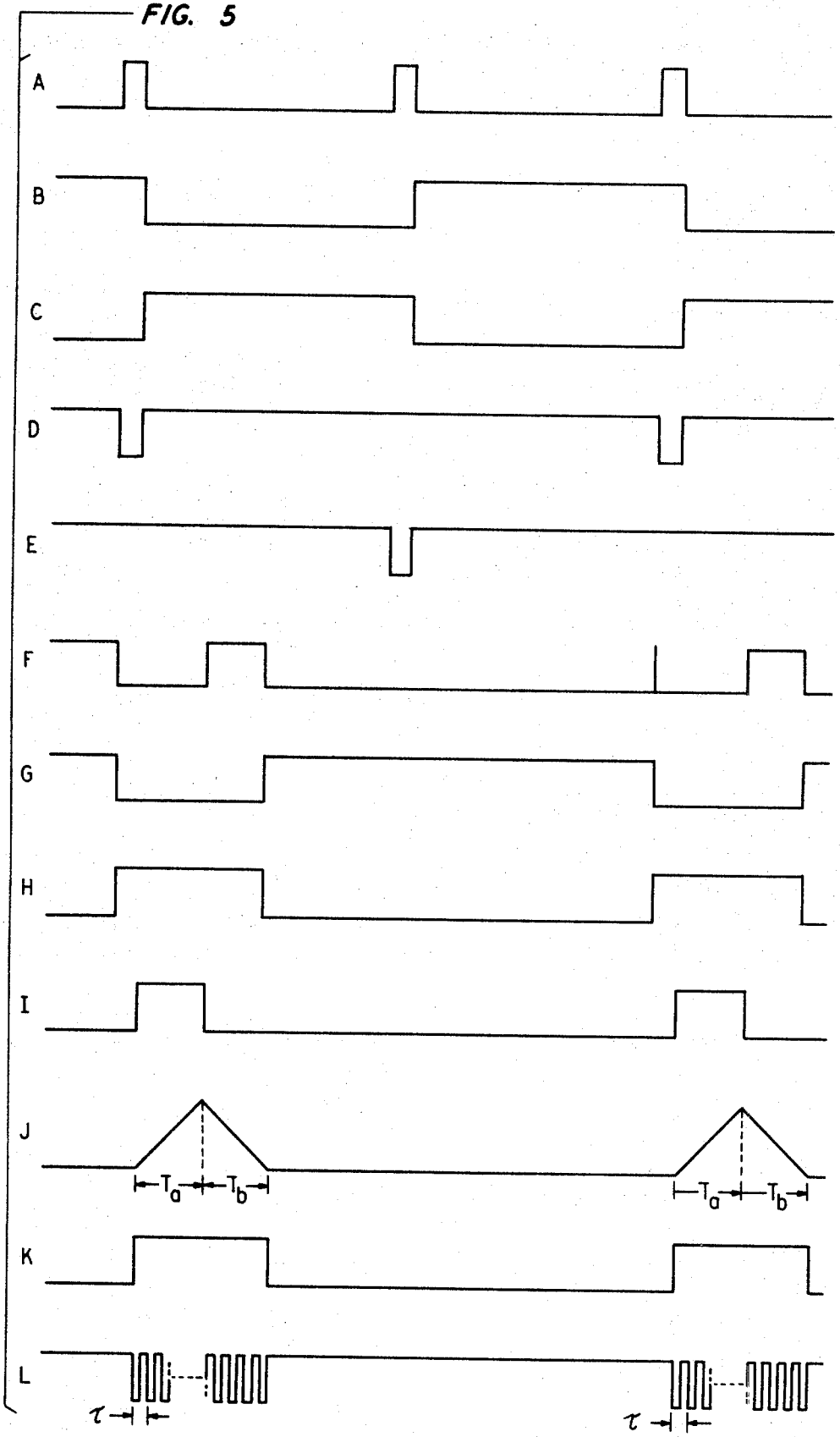

DIGITAL RATIO CIRCUIT INCLUDING ZERO SUPPRESSION

BACKGROUND OF THE INVENTION

This invention relates to computing circuits and, more particularly, to ratio circuits including zero suppression.

In numerous modern electronic systems, it is both desirable and necessary to compute the ratio of signals. Additional processing of signals representative of the computed ratios may be required to obtain an indication in a desired form. For example, in testing the quality of telephone circuits, and the like, ratios of received test signals are obtained which require amplitude scaling and are to be indicated on a zero suppressed scale.

To maintain these telephone circuits properly, such quality tests are made at frequent periodical intervals. Accordingly, efficient performance of these tests dictates the use of automated routines. Generally, the results of such automated testing are either stored for later evaluation and/or transmitted to a central location for evaluation. Thus, to facilitate such storing and/or transmitting, it is desirable that the test results be in digital form.

It is, therefore, a general object of the invention to obtain directly a digital indication of the ratio of test signals including amplitude scaling on a zero suppressed scale.

SUMMARY OF THE INVENTION

This and other objects are achieved, in accordance with the invention, in a circuit which employs a summing integrator. An analog signal representative of a desired ratio indication on a zero suppressed scale is obtained by selectively controlling the supply of test signals to the integrator. A comparator circuit is employed to generate a pulse signal having a pulse width representative of the interval between prescribed threshold levels of the analog ratio signal. A plurality of timing circuits, decade counters, flip-flop circuits and logic gates are utilized to convert the comparator output signal into digital form and to generate signals for selectively controlling the supply of test signals to the summing integrator.

In a specific embodiment of the present invention a digital indication of the ratio of first and second test signals including amplitude scaling on a zero suppressed scale is obtained by supplying direct current signals representative of the test signals to first and second inputs of a summing integrator. A first controllable gate circuit is utilized to inhibit selectively the supply of a predetermined one of the d-c signals to the integrator. In practice, the d-c signals have opposite polarities and are both supplied to the integrator for a fixed interval, i.e., the first gate is enabled. Preferably, the d-c signals are poled in such a manner that the integrator output level is positive and increasing for the fixed interval. Then, the first controllable gate is disabled and a predetermined one of the d-c signals is inhibited. This, in turn, causes the integrator output level to decrease. Said another way, the integrator yields an algebraically summed integrated version of the applied d-c signals which, in turn, is an analog representation of the desired ratio being determined. A comparator circuit converts the integrator output signal into a pulse signal having a width representative of the interval between prescribed amplitude levels of the integrator output signal, for example, the zero crossings. Conversion of the comparator output pulse signal into the desired digital form is effected by selectively supplying clock pulses at a predetermined pulse rate to a plurality of decade counters connected in series. This is achieved by employing a second controllable gate circuit which responds to the comparator output and to additional control signals.

Individual ones of the gate control signals are generated by employing a timing circuit in conjunction with a first flip-flop circuit. Others of the gate control signals are generated by utilizing second and third flip-flop circuits serially connected with the decade counters.

Output signals from each of the decade counters are supplied, in turn, to a store circuit, a decode circuit and a drive circuit for illuminating appropriate ones of the elements of display devices to indicate visually the desired digital ratio measurement. Alternatively, the outputs from the store and/or decode circuits may be supplied or otherwise transmitted to a central location where they are either immediately evaluated or stored for future evaluation.

Signals for clearing the decade counters and the second and third flip-flop circuits and for effecting transfer of the decade counter outputs to the store circuits are generated by employing logic gates which respond to the timing circuit and first flip-flop output signals.

BRIEF DESCRIPTION OF THE DRAWINGS

These and other objects and advantages of the invention will be more fully understood from the following detailed description of an illustrative embodiment thereof taken in conjunction with the appended drawings in which:

FIG. 5 illustrates another sequence of waveforms also useful in describing the embodiment of the invention shown in FIG. 1.

DETAILED DESCRIPTION

In numerous systems, signals are generated which represent the ratio of applied signals including amplitude scaling and zero suppression. In this example, the desired ratio indication represents a measure of the quality of certain telephone circuits relating to the transmission of data signals. Such a quality measurement is obtained by generating a signal representative of $$Q = 100.0 \ [2(E_2/E_1) - 1] \ , \tag{1}$$

for $E_1 \leq E_2$ and where $E_1$ and $E_2$ are direct current signals representative, in this example, of the envelope full wave average value and the envelope peak value, respectively, of a received test signal. As stated above, it is necessary to obtain a direct digital indication of the quality measurement of equation (1).

Figure 1:
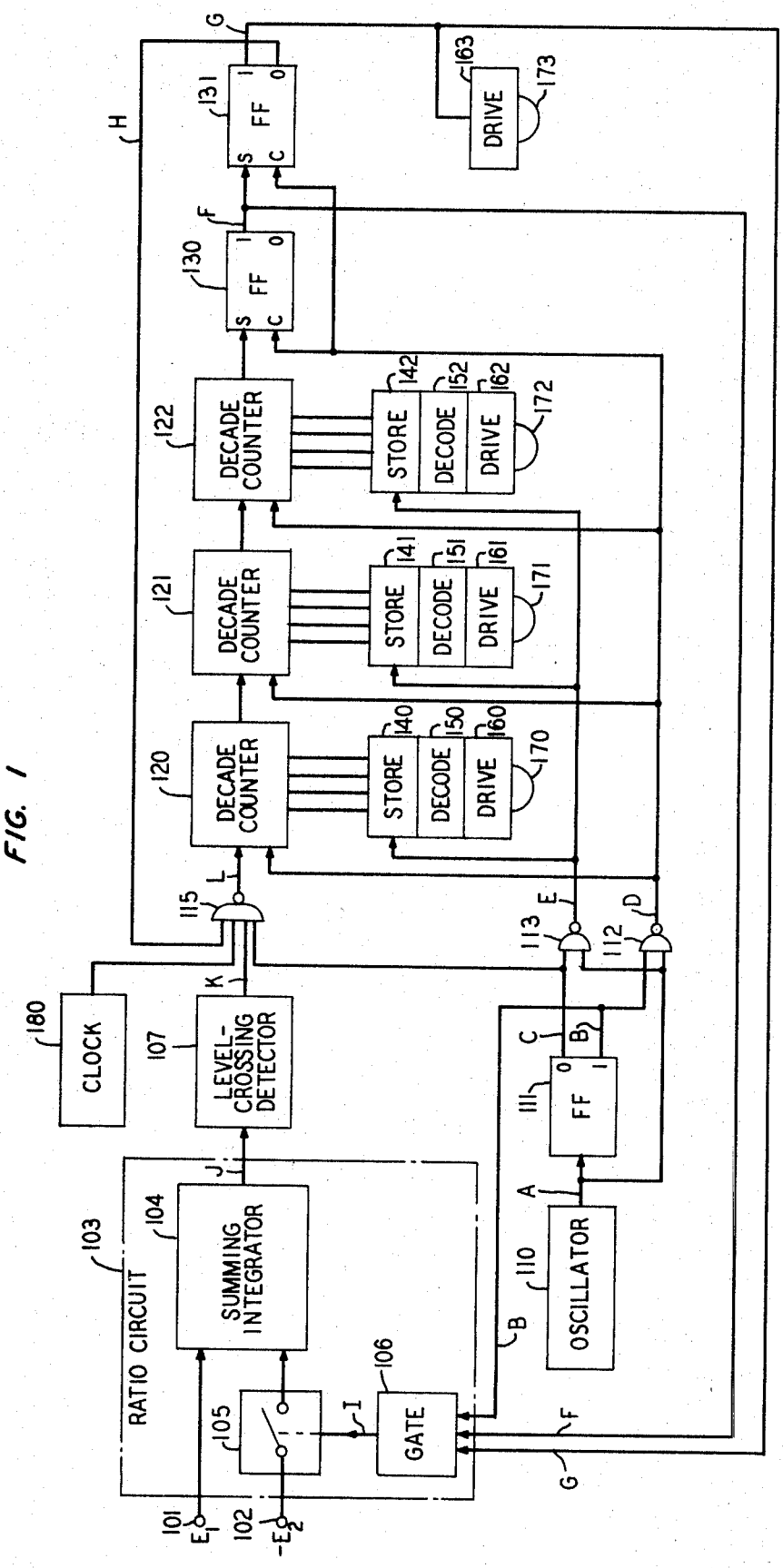
FIG. 1 is a schematic representation of a ratio circuit which illustrates the invention.

FIG. 1 shows in simplified block form a ratio circuit which, in accordance with the invention, yields a direct digital indication of the desired ratio measurement on a zero suppressed scale. Accordingly, first and second direct current signals, namely, $E_1$ and $-E_2$, having opposite polarities are supplied via terminals 101 and 102, respectively, to analog ratio circuit 103. Ratio circuit 103 includes summing integrator 104, controllable switch 105 and gate circuit 106. One d-c signal being evaluated, namely, $E_1$, is supplied directly to a first input of integrator 104 while a second d-c signal, namely, $-E_2$, is selectively supplied via switch 105 to a second input of integrator 104.

Figure 2:
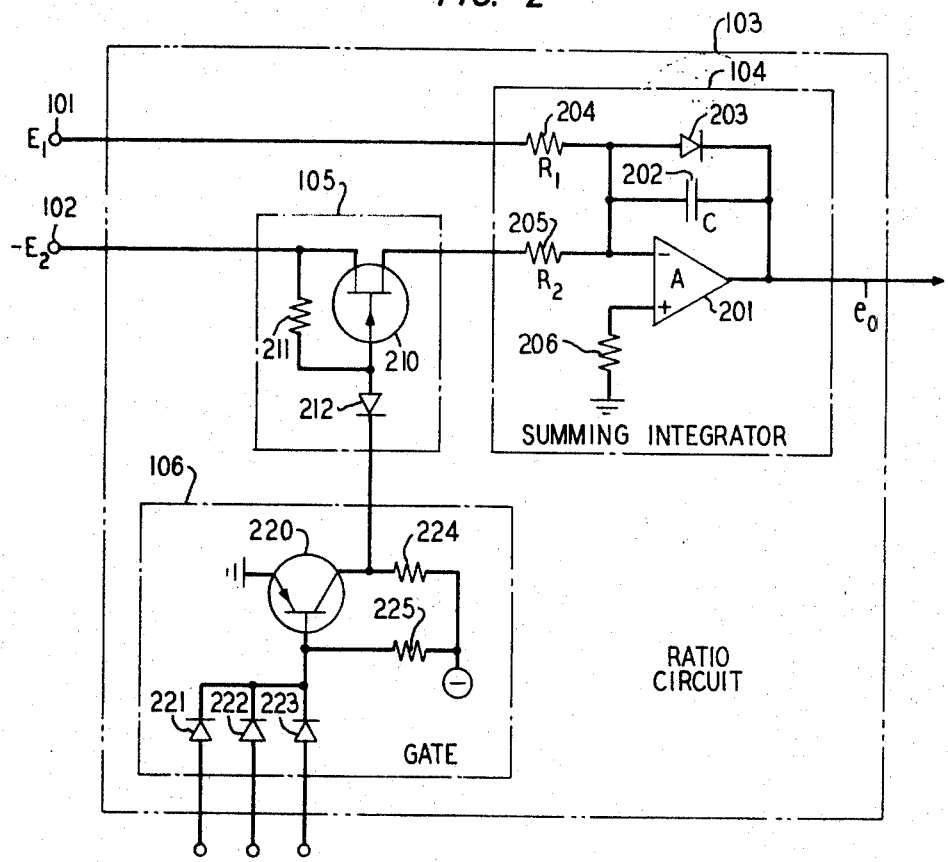
FIG. 2 shows in greater detail the summing integrator and controllable switching circuits of FIG. 1.

Referring briefly to FIG. 2, there are shown details of ratio circuit 103 including summing integrator 104, switch 105 and gate 106. Specifically, summing integrator 104 includes amplifier 201, capacitor 202, diode 203, and resistors 204, 205, and 206. Preferably, amplifier 201 is a "high" gain type commonly referred to as an operational amplifier. Amplifier 201 is employed in well known fashion with capacitor 202 and resistors 204 and 205 to yield an algebraically summed integrated version of the applied d-c signals. Diode 203 is utilized to clip the negative portion of the integrator output. Resistor 206 is employed in well known fashion to minimize drift. Controllable switch 105 includes field effect transistor (FET) 210, bias resistor 211, and blocking diode 212. In this example, FET 210 is an N-channel type which is controlled in conventional manner by output signals from gate 106. Gate 106 includes transistor 220, diodes 221, 222 and 223 and biasing resistors 224 and 225. In practice with a low state signal, for example, ground potential, supplied to each of diodes 221, 222 and 223, gate 106 is operative to supply a signal to diode 212 having an amplitude sufficient to bias FET 210 to an ON state. With a high state signal supplied to one or more of diodes 221, 222 or 223, gate 106 is operative to supply a negative potential to diode 212 sufficient to bias FET 210 into an OFF state.

In this example, ratio circuit 103 (FIG. 2) responds to applied test signals and control signals (to be discussed below) to generate an analog signal representative of $$K = 2(E_2/E_1) - 1 ,$$

Figure 3:
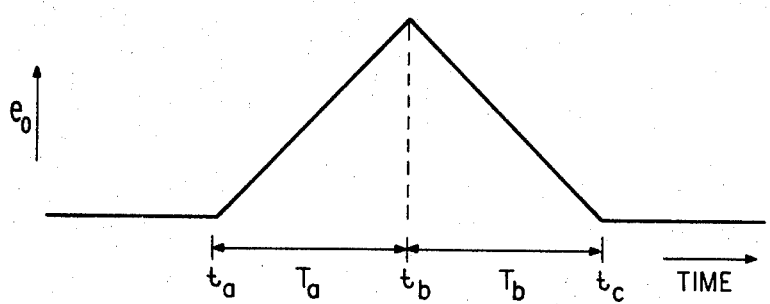
FIG. 3 illustrates a waveform useful in describing the circuits shown in FIG. 2.

(2)

for $E_1 \leq E_2$ and where $E_1$ and $E_2$ are direct current signals. FIG. 3 illustrates one example of a possible output waveform generated by ratio circuit 103.

Assuming that FET 210 (FIG. 2) is conducting at time ta, i.e., control signals representing low state signals are supplied to each of diodes 221, 222 and 223 of gate 106, then for the interval $ta \leq t \leq tb$ $$e_o(t) = (1/C) [(E_2/R_2) - (E_1/R_1)] (t - t_a) .$$

(3)

For $t > tb$ a high state control signal is supplied to at least one of diodes 221, 222 or 223 and FET 210 is biased into a nonconductive state yielding $$e_o(t) = e_o(tb) - E_1/R_1C) (t - tb) .$$

(4)

At the instant $t = tc$ equation (4) may be equated to zero. Thus, substituting the value of equation (3) at $t = tb$ into equation (4) yields $$(tc - tb/tb) = (R_1E_2/R_2E_1) - 1,$$

(5)

assuming ta equals zero. Note that equation (5) depends only upon the component values of $R_1$ and $R_2$, namely, resistors 204 and 205, respectively, and not upon the component value of capacitor 209. Selecting $R_1 = 2R_2$ yields $$K = 2 (E_2/E_1) - 1 ,$$

(6)

where $K = (tc - tb/tb) = (Tb/Ta)$, assuming ta equals zero time.

Figure 4:
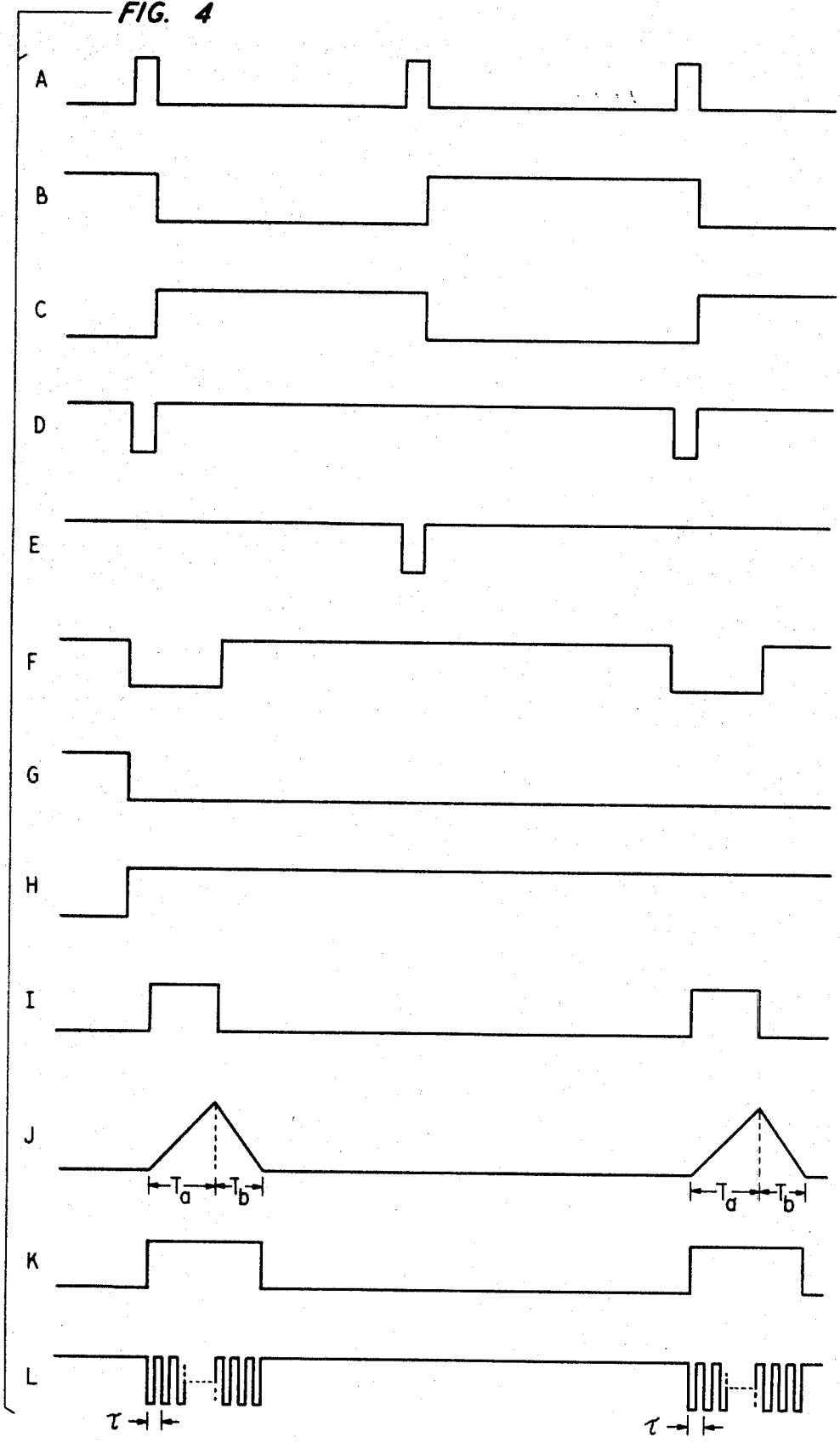
FIG. 4 depicts a sequence of waveforms useful in describing the embodiment of the invention as shown in FIG. 1.

Returning to FIG. 1, a waveform similar to that shown in FIG. 3 is developed periodically at the output of ratio circuit 103 as illustrated in waveform J of FIGS. 4 and 5. FIGS. 4 and 5 illustrate waveforms representative of signals occurring at selected points in the embodiment of the invention shown in FIG. 1 for quality measures of less than 100.0 and 100.0, respectively. The waveforms of FIGS. 4 and 5 have been labeled to correspond to the points indicated in FIG. 1.

The present invention shall first be described for obtaining a quality measure of less than 100.0. As stated above, FIG. 4 illustrates waveforms developed in the circuit of FIG. 1 for such a measurement. Accordingly, the output signal developed by ratio circuit 103 is supplied to level crossing detector 107. Level crossing detector 107 is responsive to generate a constant amplitude pulse signal having a pulse width equal to the interval between predetermined threshold levels of the output of ratio circuit 103 as shown in waveform K of FIG. 4. In this example, the threshold levels have been selected to be the zero crossings of the output of ratio circuit 103. In practice, however, most comparator or other circuits employed as zero crossing detectors have inherent threshold levels which must be surpassed before they respond to generate the desired pulse signal. Consideration of these thresholds is being neglected here, however, it can readily be shown that the output pulse width of level crossing detector 107 is still proportional to the desired ratio indication when taking such threshold levels into consideration. In turn, the output of detector 107 is supplied to a first input of NAND gate 115.

Timing pulses for initiating each cycle of a quality test are periodically generated by oscillator 110 as depicted in waveform A of FIG. 4. In practice, the initiating pulses are generated at a rate of 2 pulses per second and are supplied to flip-flop 111 and to first inputs of NAND gates 112 and 113.

Flip-flop 111 responds to the output of oscillator 110 to generate pulsating signals at its "0" and "1" outputs as shown in waveforms B and C of FIG. 4, respectively. The pulsating signal generated at the "1" output of flip-flop 111 is supplied to a first input of gate 106 and to a second input of NAND gate 112. The pulsating signal generated at the "0" output of flip-flop 111 is supplied to a second input of NAND gate 115 and to a second input of NAND gate 113.

NAND gates 112 and 113 are responsive to the output of oscillator 110 and the respective outputs of flip-flop 111 to generate periodically pulse signals as shown in waveforms D and E of FIG. 4, respectively. The output of NAND gate 112 is supplied to the clear inputs of decade counters 120, 121 and 122 and to the clear inputs of flip-flop circuits 130 and 131 at the beginning of each test cycle.

In practice, decade counters 120, 121 and 122 are preset by the negative clear pulse generated by NAND gate 112 to an initial count of zero. Flip-flop 130 responds to the negative clear pulse to generate at its "1" output a low state signal as shown in waveform F of FIG. 4. The "1" output of flip-flop 130 is supplied to the SET input of flip-flop 131 and to a second input of gate 106. Similarly, flip-flop 131 responds to the clear pulse shown in waveform D of FIG. 4 to generate low and high state signals at its "1" and "0" outputs as shown in waveforms G and H of FIG. 4, respectively. The "1" output of flip-flop 131 is supplied to drive unit 163 and to a third input of gate 106 and the "0" output of flip-flop 131 is supplied to a third input of NAND gate 115.

Gate 106 responds to the signals shown in waveforms B, F and G of FIG. 4 to generate a signal for enabling switch 105 as shown in waveform I of FIG. 4. Accordingly, direct current signals, for example $E_1$, and $-E_2$, are supplied via terminals 101 and 102, respectively, to summing integrator 104 for a fixed interval, for example, Ta of waveform J, (FIG. 4). Integrator 104 responds to the applied signals to generate a positive increasing signal for fixed interval Ta as shown in waveform J of FIG. 4. In turn, level crossing detector 107 responds to the output of integrator 104 for generating a pulse signal as shown in waveform K of FIG. 4.

NAND gate 115 responds to the output from level crossing detector 107 and to the "0" outputs of flip-flops 111 and 131, namely, the signals shown in waveforms K, C and H, respectively, selectively to supply pulse signals generated by clock 180 to the input of decade counter 120. The output from NAND gate 115 is shown in waveform L of FIG. 4. In this example, clock pulse period $\tau$ has been selected so that 1,000 pulses are generated by clock 180 during interval Ta, i.e., $Ta = 1,000\,\tau$.

At the termination of interval Ta, i.e., after 1,000 pulses have been supplied to the series connection of decade counters 120, 121 and 122, the respective counters are again at their initial count of zero and counter 122 yields a negative pulse signal which, in turn, is supplied to the SET input of flip-flop 130. In response to the negative pulse output of counter 122 the "1" outout of flip-flop 130 switches from a low state to a high state as shown in waveform F of FIG. 4. Since flip-flop 131 responds only to negative going signals there is no change at its output. Gate 106 is responsive to the high state output of flip-flop 130 to switch from a high state to a low state thereby disabling switch 105. Accordingly, signal $-E_2$ is inhibited from being supplied to integrator 104. Since $E_1$ is a positive signal which is inverted by amplifier 201 of integrator 104 (FIG. 2), the output of integrator 104 is caused to decrease after the termination of interval Ta as shown in waveform J of FIG. 4.

Level crossing detector 107 responds to the output of integrator 107 reaching zero amplitude to switch from a high state to a low state. This, in turn, disables NAND gate 115 thereby inhibiting the supply of pulses from clock 180 to the series connection of counters 120, 121 and 122. At this instant the accumulated count in decade counters 120, 121 and 122, i.e., the pulses generated during interval Tb, represents the desired quality measure in digital form. For example, from equation (6), it is seen that $$(Tb/Ta = 2\,(E_2/E_1) - 1\,. \tag{7}$$

Since $Ta = 1,000\,\tau$ and since $Tb = N\tau$, where $N$ is the accumulated count in decade counters 120, 121 and 122 at the termination of Tb it can be readily shown that $$N = 1,000\,[2(E_2/E_1) - 1] \tag{8}$$

which represents the desired quality measurement in digital form. Note that equation (8) does not depend on clock pulse period $\tau$. Accordingly, any one of a wide range of frequencies may be employed in clock 180 for generating the clock pulses.

Signals representative of the pulse count in each of counters 120, 121 and 122 are transferred to storage elements 140, 141 and 142 at an appropriate instant. This is achieved, for example, by enabling AND gates (not shown) interconnecting the outputs of counters 120, 121 and 122 and the inputs of storage elements 140, 141 and 142 via the output pulse from NAND gate 113 as shown in waveform E of FIG. 12. Storage elements 140, 141 and 142 may be any of those well known in the art, for example, register units.

The stored signals may be transmitted to a central location for evaluation or otherwise utilized as desired. For example, a visual indication of the ratio being measured is obtained by decoding the stored signals in decode units 150, 151 and 152, supplying the decoded signals to drive circuits 160, 161 and 162 for illuminating appropriate ones of the elements of display devices 170, 171 and 172, respectively. This process is iterated during each test cycle. The "1" output of flip-flop 131 is employed to illuminate display device 173 via drive 163 only when a quality measure of 100.0 is obtained.

FIG. 5 shows a sequence of waveforms illustrating signals generated in the embodiment of the invention shown in FIG. 1 for a quality measure of 100.0. Operation of the invention in obtaining a quality measure of 100.0 is essentially identical to that described above for quality measures of less than 100.0 and, therefore, will not again be discussed in great detail. The primary difference being in the operation of flip-flop circuits 130 and 131 (FIG. 1). These differences are seen by comparing waveforms F, G, and H of FIGS. 4 and 5. Briefly, when obtaining a quality measure of 100.0, 2,000 pulses generated by clock 180 (FIG. 1) are supplied to decade counters 120, 121 and 122. That is to say, intervals Ta and Tb are equal. Upon the termination of interval Ta, i.e., after 1,000 pulses have been supplied to the series connection of counters 120, 121 and 122, flip-flop 130 switches from a low state to a high state. Switch 105 is disabled. Upon the second thousand pulses being supplied to counters 120, 121 and 123, flip-flop 130 is switched from a high state to a low state. Consequently, flip-flop 131 responds to the negative going output of flip-flop 130 to generate signals at its "1" and "0" outputs as shown in waveforms G and H of FIG. 5, namely, a high state signal at the "1" output and a low state signal at the "0" output. The high state signal developed at the "1" output of flip-flop 131 is supplied to drive circuit 163 for illuminating display device 173. The low state signal developed at the "0" output of flip-flop 131 disables NAND gate 115. As can be seen from the waveforms of FIGS. 4 and 5 display device 173 is illuminated via drive unit 163 only when a quality measure of 100.0 is being displayed. At all other instances the "1" output of flip-flop 131 is in a low state and drive unit 163 is disabled.

What is claimed is:

1. A computing circuit which comprises:
   first means having a plurality of inputs and an output for algebraically summing and integrating a plurality of supplied signals;
   a source of pulse signals;
   second means responsive to said pulse signals and a signal developed at the output of said first means for generating control signals; and
   third means in circuit relationship with one of said first means inputs and being responsive to said control signals for selectively supplying a predetermined one of said supplied signals to said first means for a fixed interval and for inhibiting the new supply of said predetermined signal during other intervals, wherein the interval between the termination of said fixed interval and the instant said signal developed at the output of said first means reaches a predetermined amplitude represents the quantity being computed.

2. A computing circuit as defined in claim 1 wherein said first means includes a summing integrator having first and second inputs and an output, a first direct current signal having a first polarity being supplied to said first input, a second direct current signal having a second polarity being supplied to said second input and a signal representative of an algebraically summed integrated version of said first and second signals being developed at said output.

3. A computing circuit which comprises:
   a summing integrator having first and second inputs and an output, a first direct current signal having a first polarity being supplied to said first input;
   a source of clock pulses;
   means responsive to said clock pulses and to a signal developed at the output of said summing integrator for generating control signals; and
   means in circuit relationship with the second input of said summing integrator and being responsive to said control signals for selectively supplying a second direct current signal having a second polarity to said second input for a fixed interval and for inhibiting the supply of said second signal during other intervals, wherein the interval between the termination of said fixed interval and the instant said signal developed at the output of said integrator reaches a prescribed amplitude represents the quantity being computed.

4. A computing circuit as defined in claim 3 wherein said control signal generating means includes means responsive to the output of said integrator for generating a pulse signal having a width representative of the time interval between prescribed amplitude levels of said integrator output, counter means, gate means responsive to said time interval pulse signal for selectively supplying said clock pulses to said counter means, and means in circuit relationship with said counter means for generating said control signals, wherein the accumulated clock pulse count registered in said counter means between the termination of said fixed interval and the termination of said time interval pulse signal is a digital representation of the quantity being computed.

5. A computing circuit as defined in claim 4 wherein said selective supplying means includes controllable switch means in circuit relationship with said second integrator input.

6. A computing circuit as defined in claim 5 wherein said controllable switch means includes a field effect transistor and gate means, said gate means being responsive to said control signals for biasing said field effect transistor selectively to supply said second signal to said integrator for said fixed interval and to inhibit said second signal during said other intervals.

7. A computing circuit which comprises:
   summing integrator means having first and second inputs and an output, a first potential having a first polarity being supplied to said first input;
   means responsive to control signals for selectively supplying a second potential having a second polarity to the second input of said integrator means;
   means responsive to a signal developed at the output of said integrator means for generating a first pulse signal having a width representative of the interval between prescribed amplitude levels of said integrator output signal;
   a source of clock pulses;
   counter means;
   means responsive to said first pulse signal for selectively supplying said clock pulses to said counter means; and
   means in circuit relationship with said counter means for generating said control signals so that said second potential is supplied to said integrator means for a predetermined interval and is inhibited during other intervals, wherein the accumulated clock pulse count registered in said counter means during the interval between the termination of said predetermined interval and the termination of said first pulse signal is a digital representation of the quantity being computed.

8. A computing circuit as defined in claim 7 wherein said counter means includes a plurality of decade counters connected in series, said means for supplying said clock pulses to said counter means includes gate means and said control signal generating means includes bistable switching means.

9. A computing circuit as defined in claim 8 wherein said means for selectively supplying said second potential to said integrator means includes switch means and gate means, said gate means being responsive to signals developed at an output of said bistable switching means for controlling said switch means to supply said second potential to said integrator means for said predetermined interval and to inhibit the supply of said second potential during said other intervals.

10. A computing circuit as defined in claim 9 further including means for generating additional control signals for periodically initiating a computing cycle, said additional control signals being supplied periodically to enable said gate means.

* * * * *

UNITED STATES PATENT OFFICE
CERTIFICATE OF CORRECTION

Patent No. 3,752,972       Dated August 14, 1973

Inventor(s) Loran W. Campbell, Jr.

It is certified that error appears in the above-identified patent and that said Letters Patent are hereby corrected as shown below:

Column 3, equation 2, insert parenthesis after $E_1$.

Column 3, equation 3, insert parenthesis after $R_2$.

Column 3, equation 4, insert parenthesis before $E_1$.

Column 5, line 51, "outout" should read --output--.

Column 6, equation 7, insert parenthesis after Ta.

Column 6, equation 7, insert parenthesis after $E_1$.

Column 6, equation 8, insert parenthesis after $E_1$.

Column 7, line 25, delete "new" before supply.

Signed and sealed this 8th day of January 1974.

(SEAL)
Attest:

EDWARD M. FLETCHER, JR.　　　RENE D. TEGTMEYER
Attesting Officer　　　　　　Acting Commissioner of Patents